(12) United States Patent
Metcalfe et al.

(10) Patent No.: US 6,325,424 B1
(45) Date of Patent: *Dec. 4, 2001

(54) COUPLING ASSEMBLY HAVING ENHANCED AXIAL TENSION STRENGTH

(75) Inventors: Paul Metcalfe, Solon; Craig A. Homberg, Cuyahoga Falls; Walter G. Lockard, Hudson, all of OH (US)

(73) Assignee: The Lamson & Sessions Co., Cleveland, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,845

(22) Filed: Jan. 12, 1999

Related U.S. Application Data

(60) Provisional application No. 60/071,159, filed on Jan. 12, 1998.

(51) Int. Cl.⁷ ................................................ F16L 37/14
(52) U.S. Cl. ............................................ 285/305; 285/321
(58) Field of Search ..................................... 285/305, 321

(56) References Cited

U.S. PATENT DOCUMENTS

| | | |
|---|---|---|
| 2,597,482 | 5/1952 | Harrison et al. . |
| 2,839,218 | 6/1958 | Zerbe . |
| 3,181,897 * | 5/1965 | Krayenbuhl et al. ................ 285/305 |
| 3,334,929 | 8/1967 | Wiltse . |
| 3,422,630 * | 1/1969 | Marier ................................. 285/305 |
| 3,606,402 | 9/1971 | Medney . |
| 3,759,553 | 9/1973 | Carter . |
| 3,759,554 | 9/1973 | Carter . |
| 4,269,436 | 5/1981 | Medney . |
| 4,396,210 * | 8/1983 | Spencer et al. ...................... 285/305 |
| 4,427,221 | 1/1984 | Shay, Jr. . |
| 4,679,825 | 7/1987 | Taylor . |
| 4,697,947 * | 10/1987 | Bauer et al. ......................... 285/305 |
| 4,927,192 | 5/1990 | Ungchusri et al. . |
| 5,083,820 | 1/1992 | Hopperdietzel . |
| 5,165,832 | 11/1992 | Dimov . |
| 5,178,216 | 1/1993 | Giroux et al. . |
| 5,255,945 | 10/1993 | Toon . |
| 5,509,699 | 4/1996 | Himmelberger . |
| 5,573,279 | 11/1996 | Rea et al. . |
| 5,813,705 * | 9/1998 | Dole ................................... 285/321 |
| 5,868,443 | 2/1999 | Ungerman et al. . |
| 6,086,297 | 7/2000 | Lotfi . |

FOREIGN PATENT DOCUMENTS

| | | |
|---|---|---|
| 225666 | 4/1959 | (AU) . |
| 1397378 | 3/1965 | (FR) . |
| WO-99/40355 * | 8/1999 | (WO) . |

* cited by examiner

*Primary Examiner*—Eric K. Nicholson
(74) *Attorney, Agent, or Firm*—Jones, Day, Reavis & Pogue

(57) ABSTRACT

A coupling assembly for conduit or pipe comprising a first coupling member, a second coupling member and a locking member. The first coupling member is optionally a tubular component and the second coupling member or coupler is optionally a belled component. The present invention is also optionally provided with an annular sealing member.

14 Claims, 4 Drawing Sheets

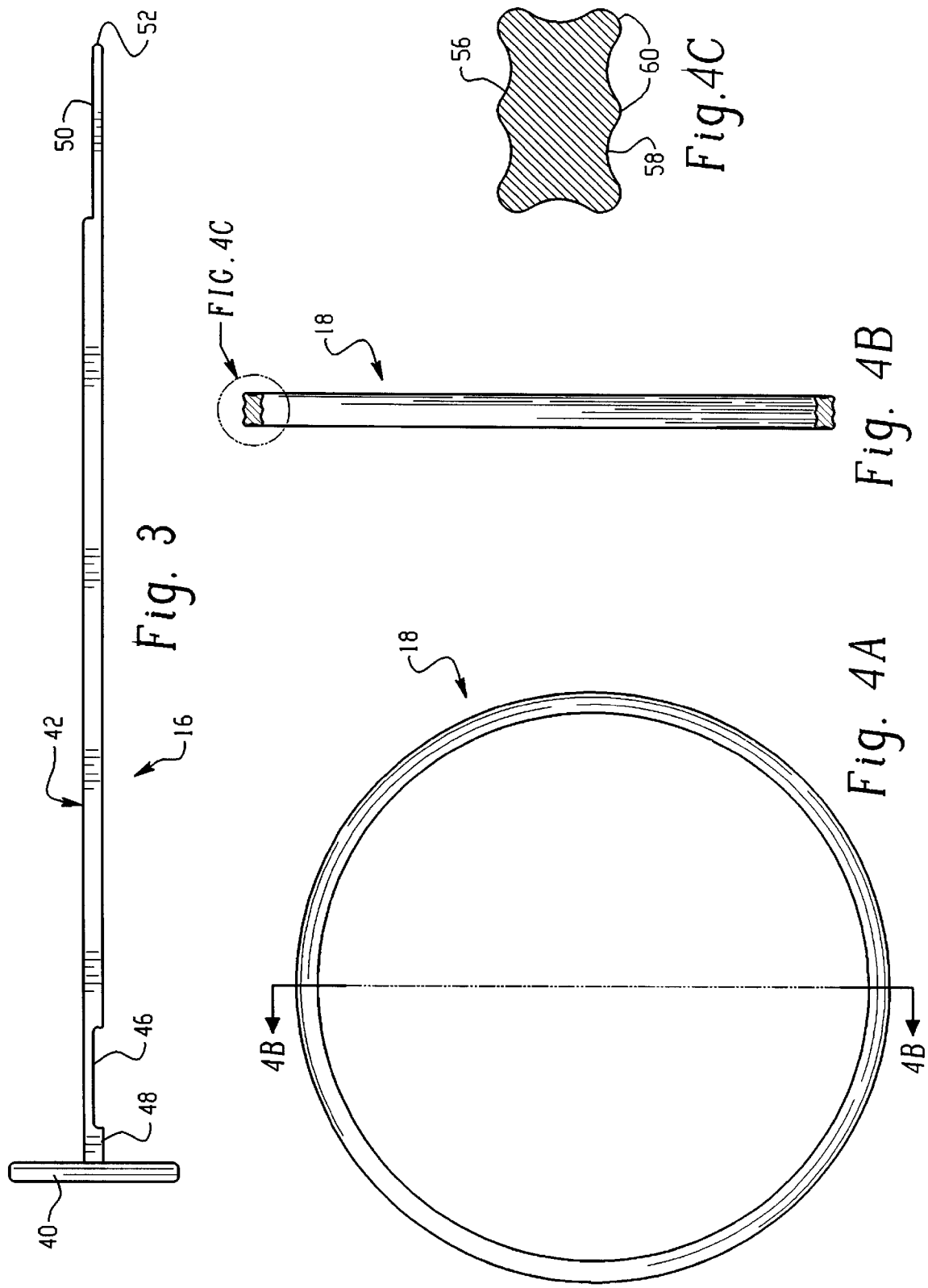

COUPLING ASSEMBLY HAVING ENHANCED AXIAL TENSION STRENGTH

This application claims the benefit under 35 U.S C. 119(e) of United States Provisional Application Ser. No. 60/071,159 filed Jan. 12, 1998.

BACKGROUND OF THE INVENTION

1. Field of the Invention

The present invention provides a coupling assembly for plastic pipe, and more particularly a coupling assembly in which the coupled pipe has enhanced axial tension strength resulting in a pipe and coupling connection that can withstand high axial loads in tension, and that require no additional means for maintaining the coupling assembly in a coupled state. This coupling assembly is particularly useful in applications that require that multiple coupled lengths of pipe be pulled long distances through underground boreholes while maintaining a seal between the coupled lengths of pipe without disconnecting. The present invention provides an inexpensive plastic coupling assembly for conduit or pipe comprising a tubular component, a coupler, an annular locking strap, and an annular sealing member, the combination being easy to assemble and disassemble and allowing at least one thousand feet of such pipe to be pulled through an underground borehole without the use of additional fasteners to maintain the coupled state.

2. Description of Related Art

Fiber optic transmission lines and other cables have increasingly replaced metallic electricity-conducting wires. For various reasons, it has been desirable to bury fiber optic cables, utility cables and utility pipes underground. To protect the cables and pipes while underground, the cables or pipes may be placed in a conduit or duct. See, e.g., U.S. Pat. No. 5,027,864 to Conti, et al. The cables may be placed in an inner duct, that, in turn, is pulled through a larger outer duct. See also U.S. Pat. No. 5,087,153, to Washburn.

One preferred material for underground duct applications is PVC pipe or tubing, which is normally supplied in lengths of 4, 10 or 20 feet, but may be supplied in other lengths. Each such length of pipe must be coupled to adjacent lengths by means of a coupling assembly. A single 20 foot length of 4-inch PVC pipe weighs approximately 45 pounds. Thus, a tunnel one thousand feet long will require that some of the coupling assemblies bear an axial tensile force of at least several thousand pounds due to the combined effects of pipe weight, frictional drag resulting from the pipe walls contacting the walls of the borehole while the conduit is pulled, or contact with other obstructions. When this several thousand pounds is applied over the surface area contacted by a locking mechanism in a coupling assembly, the pressure borne by the locking portion of the coupling assembly may be close to the tensile strength of PVC. Previously known PVC coupling assemblies could not bear such loads, or required additional fasteners. Prior art augmentation of such coupling assemblies greatly increased the difficulty, expense and even danger of using coupled lengths of plastic pipe for such applications. Coupling assemblies made from other materials such as metal were unsatisfactory for reasons such as weight, limitations of the materials, such as the proneness to corrosion of some metals (e.g., aluminum or steel); or expense (e.g., stainless steel).

Continuous lengths of plastic tubing have been used for underground duct applications. The method for installing this type of conduit into a horizontal borehole is by pulling long lengths of the tubing from a spool through the borehole. The most often used plastic tubing is polyethylene ("PE"), supplied on large, heavy spools, each containing some 600 feet of tubing. Such tubing generally has a wall thickness of 0.320 inch in a four-inch diameter. While inexpensive and widely available, PE tubing suffers from several drawbacks. Adjacent lengths must be butt sealed together by appropriate welding with a specialized apparatus. Both the tensile strength and crush resistance of PE tubing are less than that of a material such as PVC pipe. Such tubing frequently suffers from increased ovality due to the flattening effect of being coiled on the spool. A contractor installing the tubing must feed each spool from a specially designed apparatus, upon which each spool must be mounted in turn. When the end of the spooled tubing is released, it can dangerously whip around, potentially causing serious injury to workers and others. In a related effect, PE has a considerable "memory" of the curvature it has been forced to adopt while on the spool, as a result of which the PE tubing retains a strong tendency to curl after it is removed from the spool. Finally, tubing is often wasted if the length of the borehole does not equal the length of a multiple number of spools of tubing.

PVC pipe lengths have several advantages over continuous lengths of coiled tubing. With PVC pipe, the exact number of lengths needed for a job can be stacked together and delivered in an ordinary flatbed truck minimizing time, manpower, equipment and wasted material. PVC pipe has greater tensile strength and crush resistance than polyethylene tubing, and has better resistance to developing ovality. Because the lengths have not been forced to bend prior to use, they do not suffer from "memory" problems found with PE tubing.

Use of PVC pipe has not been without disadvantages. Previously known PVC pipe couplings typically required augmentation. Thus, numerous steps were performed in prior art methods to assemble the coupled lengths of PVC pipe. One method requires cementing the joint together after it is assembled. The typical coupling for such PVC pipe is a bell and spigot type coupling, in which each length of pipe has one end slightly belled outward (the coupler) and the other end not belled (the tubular component). The belled end is enlarged to a degree sufficient to allow a non-belled end of an adjacent length to enter, forming a sealed coupling when properly cemented together.

The cementing process includes all the known difficulties associated with PVC cement, including the use of noxious, hazardous solvents and the time required for the PVC cement to cure. The most serious drawback of this type of glued-together coupling for use in applications requiring installation by pulling through a substantially horizontal borehole is the lack of resistance to axially applied tension when in the coupled state. This drawback has only previously been overcome by augmenting the PVC cement with other fastening means, typically radially inserted screws. In order to securely attach the lengths together, screws such as self-tapping metal screws are inserted radially into the coupling assembly adding an additional step, equipment, and personnel. But, even with this improvement, additional time for the glue to cure is needed in advance of the time when the pipe is to be pulled through the tunnel. As a result, it is normally necessary to pre-assemble several hundred feet or the entire string of glued- and screwed-together PVC pipe, before the pulling process can be started.

An additional drawback of using bell and spigot coupling assemblies results from the diameter of the bell end, which is larger than the remainder of the pipe. This increased diameter makes the installation of the pipe through the underground borehole more difficult due to increase drag especially when rocks, roots, or other obstructions are encountered. The screw heads also increase the installation difficulties because they extend radially outwardly from the bell further increasing the outside diameter of this portion of the pipe and provide a location for encountering snags with obstructions.

The present invention provides a simpler, stronger, and easier to assemble coupling assembly than any known heretofore.

SUMMARY OF THE INVENTION

A major difficulty that must be overcome when pulling any duct through an underground borehole or other passage is the high axial tension the duct and its coupling assemblies must withstand. This is particularly true for lengths of duct held in the coupled state by known coupling assemblies. The present invention provides an inexpensive plastic coupling assembly for conduit or pipe, comprising a first coupling member, a second coupling member and a locking member. The first coupling member is optionally a tubular component and the second coupling member or coupler is optionally a belled component. The present invention is also optionally provided with an annular sealing member. The combination is easy to assemble and disassemble and allows at least one thousand feet of such pipe to be pulled through an underground borehole without the use of additional fasteners to maintain the coupled state. The coupling assembly may be assembled without the use of tools by manually inserting the tubular component into the coupler and then inserting the locking strap into a slot and into a locking strap passageway. The coupling assembly may be disassembled without the use of tools by performing the installation sequence in reversed order. When assembled, the locking strap is disposed in a locking position between the coupler and the tubular component and the annular sealing member is disposed in a sealing position between the coupler and the tubular component. The coupling assembly remains locked and sealed when subjected to high axial pulling forces. The coupling assembly of the present invention requires no augmentation to its strength for axial tension, the locking strap providing sufficient strength when in its locking position that no additional fasteners or glue are needed to maintain the coupling assembly in the coupled state.

The coupling assembly of the present invention further provides a smooth, obstruction-free inner surface and a relatively smooth outer surface. The outer surface is generally convex, although it preferably has a central constant-diameter portion. The outside diameter of the coupler is only slightly greater than the diameter of the pipe or tubular component, and the outside diameter of the coupler tapers to a smaller diameter toward the end of the coupler. The coupling is therefore relatively smooth and avoids the possibility of snags or excessive frictional interactions with the walls of or obstructions within the borehole through which the pipe is installed.

The preferred coupler has an inner surface that includes a groove used in locking the coupling assembly together, a stop surface used to prevent over-insertion of the tubular component, and a groove for an annular seal.

The coupling assembly of the present invention further provides high strength against lateral forces tending to bend the coupling assembly and result in breakage of either the locking or sealing function. This strength derives from the depth of insertion of the tubular component into the coupler and from the strength of the materials of construction of the coupler, and the relative positions of the locking ring and sealing member. The method of the invention is simpler than previously known methods, due to the advantages of the present invention.

As will be appreciated, the invention is capable of other and different embodiments, and its several details are capable of modifications in various respect, all without departing from the spirit of the invention. Accordingly, the drawings and description of the preferred embodiment are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein:

FIG. 3 is a view of a preferred locking key.

FIG. 4 is a view of a preferred sealing member.

DETAILED DESCRIPTION OF THE PREFERRED EMBODIMENT

Figure 1:
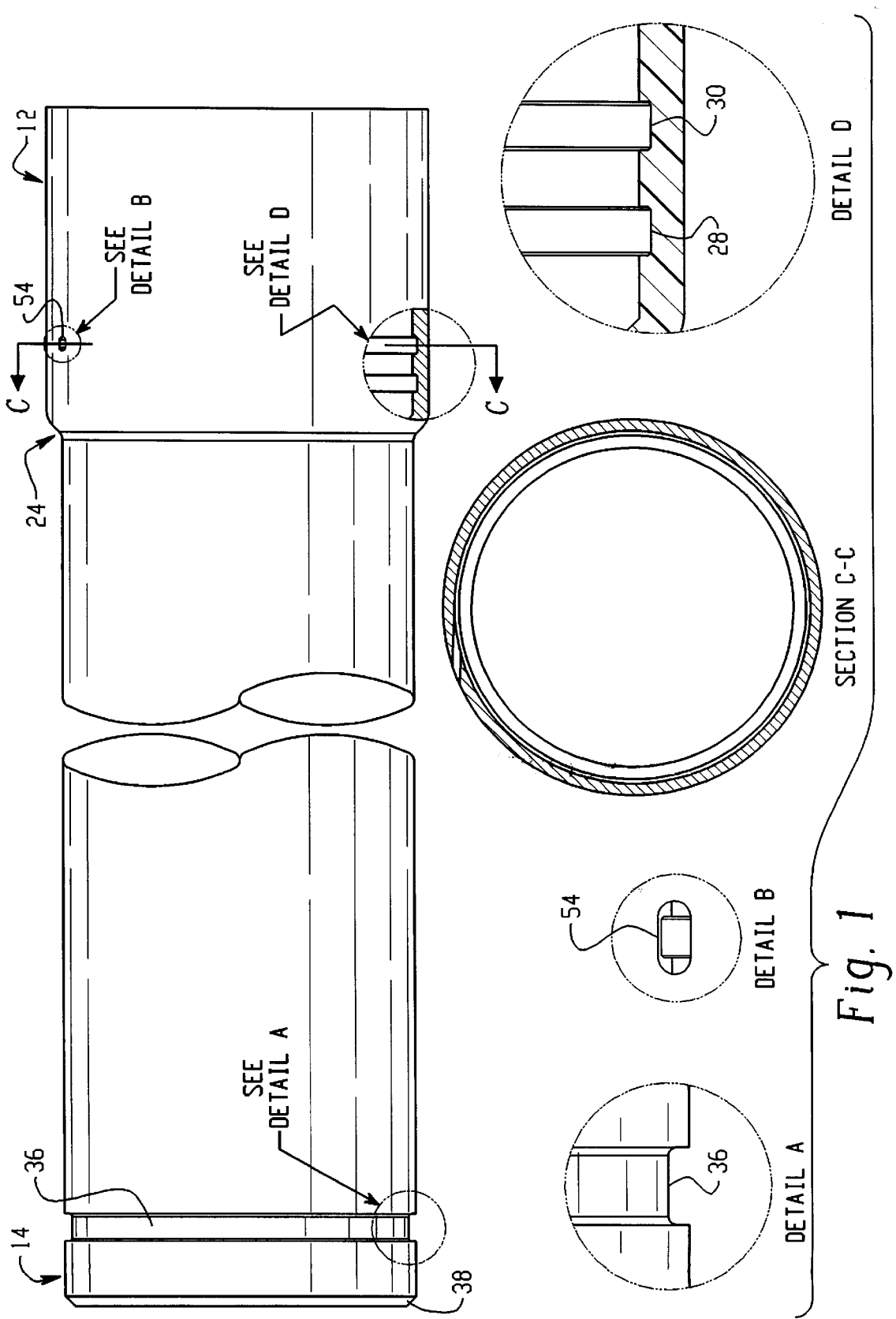
FIG. 1 is a view of a preferred conduit having the coupling elements that form the coupling assembly of the present invention.
Figure 2:
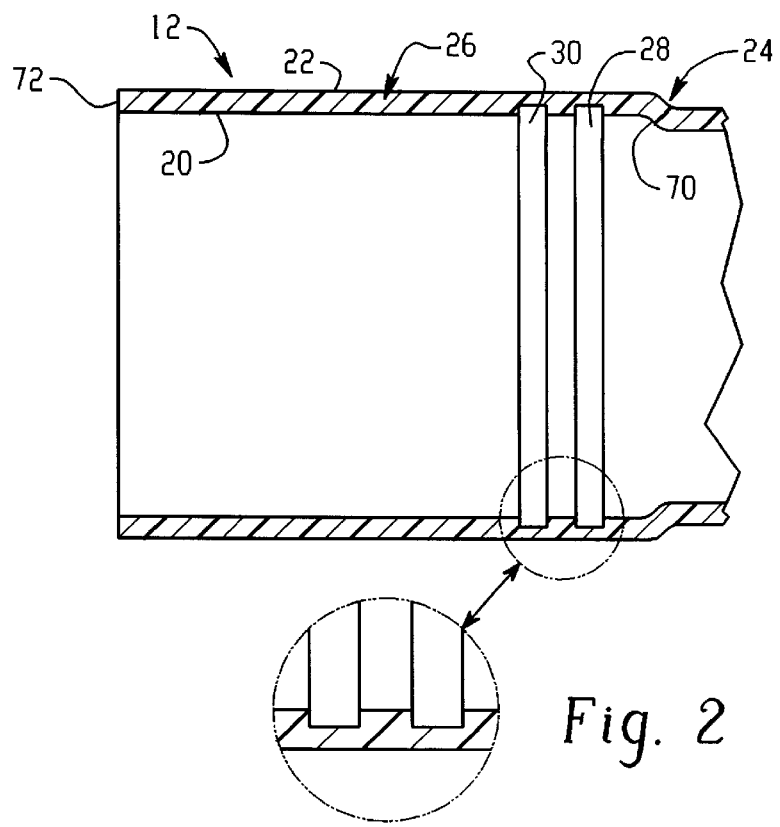
FIG. 2 is a view of a preferred coupler component.
Figure 6:
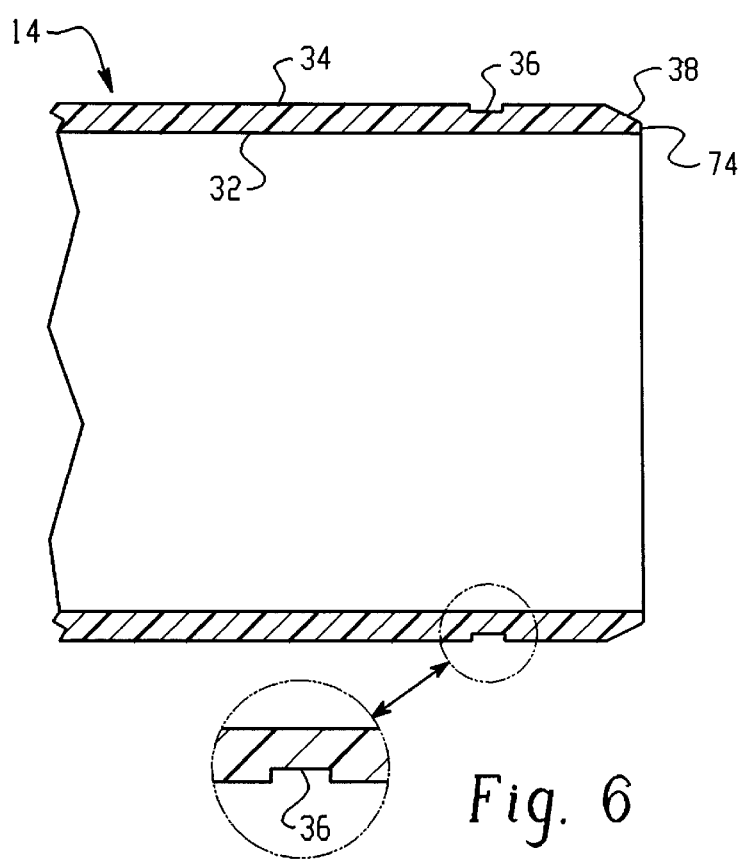
FIG. 6 is a view of a preferred tubular component.

The following description is made with reference to the drawings. As shown in FIGS. 1–6, the preferred coupling assembly of the present invention includes a coupler 12, a tubular component 14, a locking key 16, and an annular sealing member, such as annular sealing seal 18. The coupling assembly is designed to assemble easily and by hand, but to strongly resist both high axial tension and high lateral stress.

The coupler 12 is formed at one end of a section of the tubing and has an inner surface 20, an outer surface 22, and a pipe wall 72. The coupler 12 has a curved region 24 at which both the inner diameter ("ID") and the outer diameter ("OD") of the curved region 24 gradually increase until the inner diameter of curved region 24 exceeds the outer diameter of the tubular portion of the coupler 12. Resistance to snags on roots and rocks is greater on the pipe coupling according to this invention due to the gradual transition of the coupler OD. The prior art coupling design offers no transition, but has a 90 degree edge that is from 0.5 to 0.75 inches high per side. The coupling of this invention makes a minor 0.25 inch transition over approximately 1.5 inches. The inner surface 20 of the curved region 24 also provides a stop surface 70 to prevent over insertion of the tubular component 14.

The curved region 24 terminates into a slightly tapered region 26. The slightly tapered region 26 is provided with a seal groove 28 and a locking strap groove 30 on inner surface 20. Seal groove 28 is shallow, approximately 0.07 to 0.08 inches, allowing for a thicker pipe wall 72 and the resultant increase in tensile strength of the pipe joint. This is critical because the seal groove 28 is one of the weakest areas of the pipe joint in pure tensile strength loading. Even with the thicker pipe wall, the OD of the coupler 12 can be made smaller, nominally 5.0 inches, compared to the competing coupled pipe design that are 5.5 or 6.0 inches in diameter. The reduced OD allows for the drilling of a smaller hole for installation of the pipe thus reducing installation cost based on reduced drilling time and labor.

The slightly tapered region 26 of the most preferred embodiment is at least approximately 6 inches in length that enables greater engagement and depth of overlap of the coupling 12 compared to the prior art devices. Engagement and depth of overlap of the pipe joints has direct impact on the strength of the joint while being bent. Analysis indicates that lower overlap results in a significant decrease in the ability of the joint to withstand bending. The competing design has only 4 inches of engagement of the pipe.

Coupler 12 is also provided with a slot 54 in region 26 that extend from outer surface 22 to locking strap groove 30 on inner surface 20. Slot 54 is formed tangent to the centerline of locking strap groove 30.

The tubular component 14 is formed at the other end of the tubing. The tubular component 14 has an inner surface 32 and an outer surface 34. Outer surface 34 is provided with a locking strap recess 36. Locking strap recess 36 is provided with a wider width than locking groove 30 to provide an adjustability feature enabling the insertion of locking strap 16 without further positioning of tubular component 14 and coupler 12. When the tubular component 14 is installed in coupler 12, the locking strap recess 36 is opposite locking strap groove 30 to form locking strap passageway. The tubular component 14 is also provided with a beveled or chamfered end surface 38 adjacent the tube end 74. The preferred tubular component 14 is constructed from a thermoplastic material.

The locking strap 16 is made of any plastic material possessing sufficient tensile strength to withstand the pressure exerted on the pipe such as nylon and includes a handle portion 40 and a body portion 42. Handle portion 40 is permanently attached to one end of body portion 42 and is provided with a grip portion 44 that is attached approximately perpendicular to body portion 42 to aid in inserting and de-installing the locking strap 16. Body portion 42 has a first reduced thickness area 46 at a handle end 48 and a second reduced thickness area 50 at forward insertion end 52. Reduced thickness areas 46, 50 have half the cross section width of the full section of the remainder of the locking strap 16. This reduction of the cross section enables the overlapping of the ends 48, 52 of the locking strap 16 to bear the load of the entire circumference of the engagement between the locking strap 16 and the mating locking strap groove 30 and locking strap recess 36. This is necessary because when the locking strap 16 passes through the slot 54 of the coupler 12 and into the locking strap passageway, there would be a loss of engagement with a portion of the passageway. To eliminate this loss of engagement and to construct a stronger joint, the reduced spline cross section enables the overlap of the ends of the spline. The performance of ultimate tensile pull increases by as a result.

The coupling assembly is also provided with an annular sealing member, such as annular sealing seal 18. Seal 18 is has an upper surface 56 and a lower surface 58 and is generally rectangular in cross-section. Both the upper surface 56 and lower surface 58 are provided each with three sealing lobes 60. Each sealing lobe 60 forms a separate sealing surface when seal 18 is installed in the coupling assembly as compared to only one sealing surface if a seal with another cross-section, such as circular or rectangular, was used. The cross-sectional dimensions of seal 18 are small, approximately 0.200 inches by 0.122 inches in the most preferred embodiment but other dimensions could be used, enabling the load bearing pipe wall thickness to be maximized due to the multiple sealing lobes, without compromising sealing functionality. The minimized cross-sectional dimensions of seal 18 also allow seal groove 28 to be shallow, allowing for a thicker pipe wall 72 and the resultant increase in tensile strength of the pipe joint. This is critical because the seal groove 28 is one of the weakest areas of the pipe joint in pure tensile strength loading.

If a circular cross-sectional seal was used, as in similar competing products, and the wall thickness of the coupling remained the same, the diameter of the pipe would have to increase. This would require that a larger hole be drilled in the earth resulting in increased installation costs due to increased incremental drilling time and labor. The OD of the pipe coupling in the most preferred embodiment is nominally 5.0 inches and could be less compared to 5.5 to 6.0 inches of prior art coupled pipe designs.

Moreover, if the circular cross sectional seal was used, the insertion force would increase, requiring the use of tools to assemble the pipe joint. Insertion forces for the coupling of this invention are about a fourth of what it would be if a circular cross sectional seal were used thus enabling the joint to be assembled without tools. In the event disassembly of the joint is required, the low compression and drag of the seal 18 on the pipe allow disassembly of the joint without tools.

To assemble the pipe coupling, seal 18 is placed into seal groove 28 of coupler 12 of a first tube. Tubular component 14 of a second tube is then inserted into coupler 12 of the first tube. Tubular component 14 is inserted until chamfered surface 38 rests against the inner surface of curved transition region 24. Seal 18 does not provide too much resistance during the insertion of tubular component 14 because of its reduced cross-sectional dimensions but forms an effective seal due to its multiple lobes 60 pressing against the outer surface 34 of tubular component 14. When fully inserted, chamfered surface 38 rests against the inner surface of curved transition region 24. Locking strap recess 36 of tubular component 14 aligns with locking strap groove 30 of coupler 12 to form a locking strap passageway. Locking strap recess 36 may be provided wider than groove 30 to allow some degree of adjustability. The two pipes are now in position for locking. The forward end 52 of locking strap 16 is inserted through slot 54 on coupler 12. Locking strap 16 passes through the slot 54 and is received into locking strap passageway. Locking strap 16 is completely inserted causing forward end 52 to overlap with handle end 48 and the handle 40 to abut against the outer surface 22 of coupler 12 creating a strengthened coupling.

If disassembly of the pipe coupling is needed, this can be accomplished without resort to tools. Handle 40 can be grasped to pull locking strap 16 out of locking strap passageway. Because of the slight adjustability of the pipe coupling due to the recess 36 being slightly wider than groove 30, tubes on either side of the coupling can be moved away from the coupling and also due to the decreased cross-section of the seal, the pipe coupling can be separated.

The coupling assembly of this invention may be favorably used with pipes made from a variety of materials, including a metal or a thermoplastic or a thermoset plastic. For practical reasons this invention is particularly useful in pipes made from thermoset plastic materials, such as ethylene-propylene copolymers and others, but especially PVC In principal, however, the coupling assembly may be conveniently used with thermoset plastic pipes.

Having described in detail the preferred embodiment of the present invention, it is to be understood that this invention could be carried out with different elements and steps. This preferred embodiment is presented only by way of example and is not meant to limit the scope of the present invention which is defined by the following claims.

What is claimed is:

1. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing groove closest to said transition region and a first coupler locking strap groove on the opposite side of said sealing groove from said transition region, said second coupler end portion having a second coupler outer surface sized for close reception within said first coupler end portion, said second coupler end portion having a second coupler end and a circumferential outer chamferedend surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, and one of said locking strap grooves being wider than the other to allow insertion of a locking strap thereinto through said slot despite some misalignment therebetween.

2. The conduit of claim 1 including a sealing ring having a generally rectangular cross-sectional shape received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit.

3. The conduit of claim 1 wherein said sealing ring has at least three inner and outer lobes thereon engaging both the bottom of said sealing groove and said second coupler outer surface.

4. The conduit of claim 1 wherein said one locking strap groove that is wider than the other comprises said second coupler locking strap groove.

5. The conduit of claim 1 wherein said sealing ring has at least three inner and outer lobes thereon engaging both the bottom of said sealing groove and said second coupler outer surface.

6. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing groove closest to said transition region and a first coupler locking strap groove on the opposite side of said sealing groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring having a generally rectangular cross-sectional shape and being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, one of said locking strap grooves being wider than the other to allow insertion of a locking strap thereinto through said slot despite some misalignment therebetween, and a locking strap received in said first and second coupler locking strap grooves through said slot to lock the coupling between the first and second coupler end portions on said first and second tubular conduits together against separation.

7. The conduit of claim 5 wherein said one locking strap groove that is wider than the other comprises said second coupler locking strap groove.

8. A tubular conduit having opposite coupler end portions for joining together a plurality of such conduits end-to-end, said tubular conduit consisting essentially of a plastic tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves being the sole grooves in said first coupler inner surface and including a sealing groove closest to said transition region and a first coupler locking strap groove on the opposite side of said sealing groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler locking strap groove being the sole groove in said second coupler outer surface, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation, and one of said locking strap grooves being wider than the other to allow insertion of a locking strap thereinto through said slot despite some misalignment therebetween.

9. The conduit of claim 7 including a sealing ring having a generally rectangular cross-sectional shape received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit.

10. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing groove closest to said transition region and a first coupler locking strap groove on the opposite side of said sealing groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, and said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation.

11. The conduit of claim 10 including a sealing ring received in said scaling ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit.

12. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing groove closest to said transition region and a first coupler locking strap groove on the opposite side of said sealing groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation.

13. A tubular conduit having opposite coupler end portions for joining together a plurality of such conduits end-to-end, said tubular conduit consisting essentially of a plastic tubular conduit having a conduit inner surface and opposite first and second coupler end portions, said first coupler end portion having first coupler inner and outer surfaces, said conduit inner surface being outwardly curved adjacent said first coupler end position along a transition region between said conduit inner surface and said first coupler inner surface, said first coupler inner surface having a pair of spaced-apart circumferential grooves therein adjacent said transition region, said pair of spaced-apart circumferential grooves being the sole grooves in said first coupler inner surface and including a sealing groove closest to said transition region and a first coupler locking strap groove on the opposite side of said sealing groove from said transition region, said second coupler end portion having a second coupler outer surface sized for close reception within said first coupler end portion, second coupler end portion having a second coupler end and a circumferential Outer chamfered end surface that slopes outwardly from said second coupler end toward said second coupler outer surface, a second coupler locking strap groove in said second coupler outer surface adjacent said second coupler end, said second coupler locking strap groove being the sole groove in said second coupler outer surface, the spacing between said first coupler locking strap groove and said transition region and between said second coupler end and said second coupler locking strap groove being such that said first and second coupler locking strap grooves are aligned when a second coupler end portion on one conduit is received in a first coupler end position on another conduit with the second coupler end on the one conduit resting against the transition region on the other conduit, the spacing between said scaling ring groove and said transition region and between said second coupler end and said second coupler locking strap groove being such that said scaling ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, and said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation.

14. The conduit of claim 7 including a sealing ring received in said sealing ring groove and projecting therefrom for engaging a said second coupler outer surface between said second coupler locking strap groove and said outer chamfered end surface when a second coupler end portion on one conduit is received in a first coupler end portion on another conduit with second coupler end on the one conduit resting against the transition region of the other conduit.

* * * * *

UNITED STATES PATENT AND TRADEMARK OFFICE
CERTIFICATE OF CORRECTION

PATENT NO.    : 6,325,424 B1
DATED         : December 4, 2001
INVENTOR(S)   : Metcalfe et al.

It is certified that error appears in the above-identified patent and that said Letters Patent is hereby corrected as shown below:

Column 7,
Line 21, change "chamberedend" to -- chamfered end --.

Column 8,
Lines 3 and 7, change "1" to -- 2 --.

Column 9,
Line 8, change "5" to -- 6 --.
Line 54, change "scaling" to -- sealing --.

Column 10,
Line 10, change "7" to -- 8 --.

Column 11,
Line 9, change "scaling" to -- sealing --.

Column 12,
Line 19, change "position" to -- portion --.
Line 37, before the first instance of "second" insert -- said --.
Line 38, change "Outer" to -- outer --.
Line 52, change "position" to -- portion --.
Lines 56 and 60, change "scaling" to -- sealing --.

Column 14,
Line 1, change "7" to -- 8 --.

Signed and Sealed this

Sixteenth Day of July, 2002

*Attest:*

JAMES E. ROGAN
*Attesting Officer*    Director of the United States Patent and Trademark Office

UNITED STATES PATENT AND TRADEMARK OFFICE
CERTIFICATE OF CORRECTION

PATENT NO.    : 6,325,424 B1
DATED         : December 4, 2001
INVENTOR(S)   : Metcalfe et al.

It is certified that error appears in the above-identified patent and that said Letters Patent is hereby corrected as shown below:

Column 7,
Line 22, change "chamferedend" to -- chamfered end --.

Column 8,
Line 3, change "1" to -- 2 --.
Lines 5 and 12, before "groove" insert -- ring --.
Line 10, change "wherein said" to -- including a --; same line, change "has" to -- having --.

Column 9,
Line 8, change "5" to -- 6 --.
Line 56, change "scaling" to -- sealing --.

Column 10,
Line 10, change "7" to -- 8 --.

Column 11,
Line 9, change "scaling" to -- sealing --.

Column 12,
Lines 20 and 52, change "position" to -- portion --.
Line 37, before the first instance of "second" insert -- said --.
Line 38, change "Outer" to -- outer --.
Lines 56 and 59, change "scaling" to -- sealing --.

UNITED STATES PATENT AND TRADEMARK OFFICE
CERTIFICATE OF CORRECTION

PATENT NO.    : 6,325,424 B1
DATED         : December 4, 2001
INVENTOR(S)   : Metcalfe et al.

It is certified that error appears in the above-identified patent and that said Letters Patent is hereby corrected as shown below:

Column 14,
Line 1, change "7" to -- 13 --.

This certificate supersedes Certificate of Correction issued July 16, 2002.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,325,424 B1
APPLICATION NO. : 09/228845
DATED : December 4, 2001
INVENTOR(S) : Metcalfe et al.

It is certified that error appears in the above-identified patent and that said Letters Patent is hereby corrected as shown below:

Column 6,
Line 58, change "thermoset plastic" to -- thermoplastic --.

Column 7,
Line 21, change "chamferedend" to -- chamfered end --.

Column 8,
Line 3, change "1" to -- 2 --.
Lines 5 and 12, before "groove" insert -- ring --.
Line 10, change "wherein said" to -- including a --; same line, change "has" to -- having --.

Column 9,
Line 8, change "5" to -- 6 --.
Line 56, change "scaling" to -- sealing --.

Column 10,
Line 10, change "7" to -- 8 --.

Column 11,
Line 9, change "scaling" to -- sealing --.

Column 12,
Lines 20 and 52, change "position" to -- portion --.
Line 37, before the first instance of "second" insert -- said --.
Line 38, change "Outer" to -- outer --.
Lines 56 and 60, change "scaling" to -- sealing --.

UNITED STATES PATENT AND TRADEMARK OFFICE
CERTIFICATE OF CORRECTION

PATENT NO. : 6,325,424 B1
APPLICATION NO. : 09/228845
DATED : December 4, 2001
INVENTOR(S) : Metcalfe et al.

It is certified that error appears in the above-identified patent and that said Letters Patent is hereby corrected as shown below:

Column 14,
Line 1, change "7" to -- 13 --.

This certificate supersedes all previously issued Certificates of Correction.

Signed and Sealed this

First Day of July, 2008

JON W. DUDAS
*Director of the United States Patent and Trademark Office*

(12) EX PARTE REEXAMINATION CERTIFICATE (6379th)

United States Patent
Metcalfe et al.

(10) Number: US 6,325,424 C1
(45) Certificate Issued: Aug. 19, 2008

(54) COUPLING ASSEMBLY HAVING ENHANCED AXIAL TENSION STRENGTH

(75) Inventors: Paul Metcalfe, Solon, OH (US); Craig A. Homberg, Cuyahoga Falls, OH (US); Walter G. Lockard, Hudson, OH (US)

(73) Assignee: Bank of Montreal, Chicago, IL (US)

Reexamination Request:
No. 90/007,854, Dec. 21, 2005

Reexamination Certificate for:
Patent No.: 6,325,424
Issued: Dec. 4, 2001
Appl. No.: 09/228,845
Filed: Jan. 12, 1999

Certificate of Correction issued Jul. 16, 2002.

Certificate of Correction issued Jun. 3, 2003.

Related U.S. Application Data
(60) Provisional application No. 60/071,159, filed on Jan. 12, 1998.

(51) Int. Cl.
*F16L 37/14* (2006.01)

(52) U.S. Cl. .................................... 285/305; 285/321
(58) Field of Classification Search .................. None
See application file for complete search history.

(56) References Cited

U.S. PATENT DOCUMENTS

| 3,606,402 A | 9/1971 | Medney |
| 4,679,825 A | 7/1987 | Taylor |
| 4,927,192 A | 5/1990 | Ungchusri et al. |
| 5,255,945 A | 10/1993 | Toon |
| 5,813,705 A | 9/1998 | Dole |
| 5,868,443 A | 2/1999 | Ungerman et al. |

FOREIGN PATENT DOCUMENTS

| AU | 225666 | 4/1959 |
| CA | 0993010 | 7/1976 |
| CA | 2258339 | 4/2005 |
| EP | 0 694 726 A1 | 1/1996 |
| FR | 1238801 | 8/1960 |
| FR | 1397378 | 4/1965 |

OTHER PUBLICATIONS

Certain Teed, PVC Water Transmission Pipe Installation Guide, 1990, 24 pp.
CertainTeed brochure, Yelomine, PVC Pipe and Fittings for Mining and Other Industrial Uses, 1985, 8 pp.
Letter from requester's Canadian attorneys to patent owner's Canadian attorneys, dated Sep. 19, 2007, 3 pp.
Decision of Canadian Re–examination Board, dated Mar. 12, 2005, 7 pp.
Letter from Canadian Re–examination Board to patent owner's Canadian attorneys, dated Jul. 6, 2006, 14 pp.
Letter from requester's Canadian attorneys to the Re–examination Board, dated May 23, 2006, 10 pp.
Request for Reexamination of Canadian Patent No. 2,258,339, dated Feb. 3, 2006, 41 pp.
"Handbook of PVC Pipe, Design and Construction," Uni–Bell PVC Pipe Association, 1991, pp. 350–354.
"Carlon PS46," Jun. 1990.

*Primary Examiner*—Jeffrey R. Jastrzab

(57) ABSTRACT

A coupling assembly for conduit or pipe comprising a first coupling member, a second coupling member and a locking member. The first coupling member is optionally a tubular component and the second coupling member or coupler is optionally a belled component. The present invention is also optionally provided with an annular sealing member.

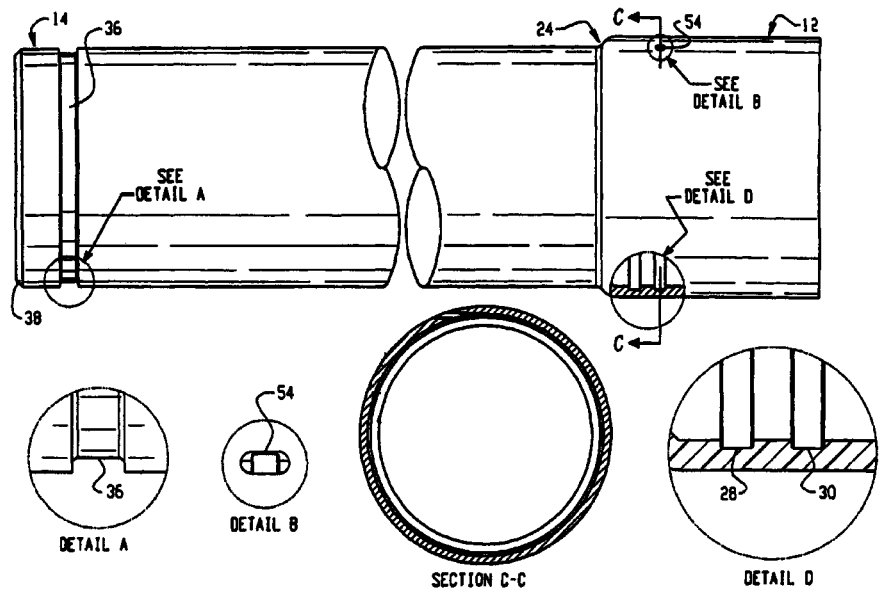

Figure 5:
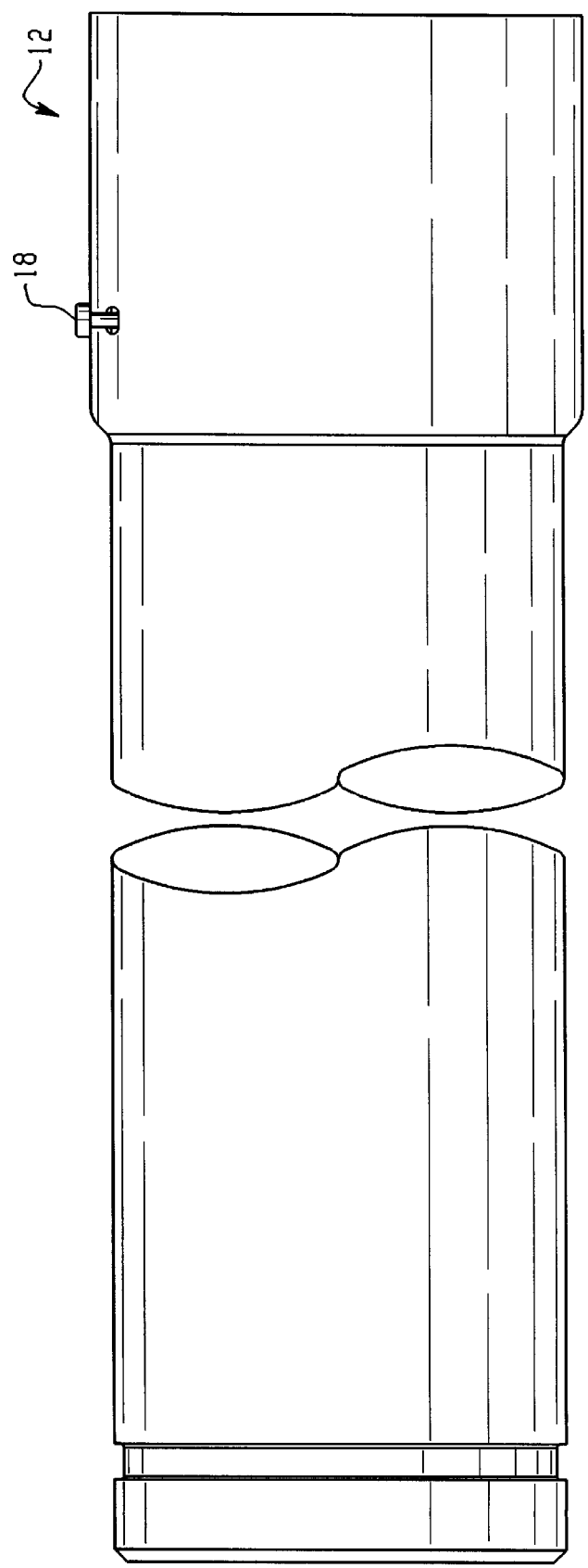
FIG. 5 is a view of a preferred conduit assembly with an installed locking key.

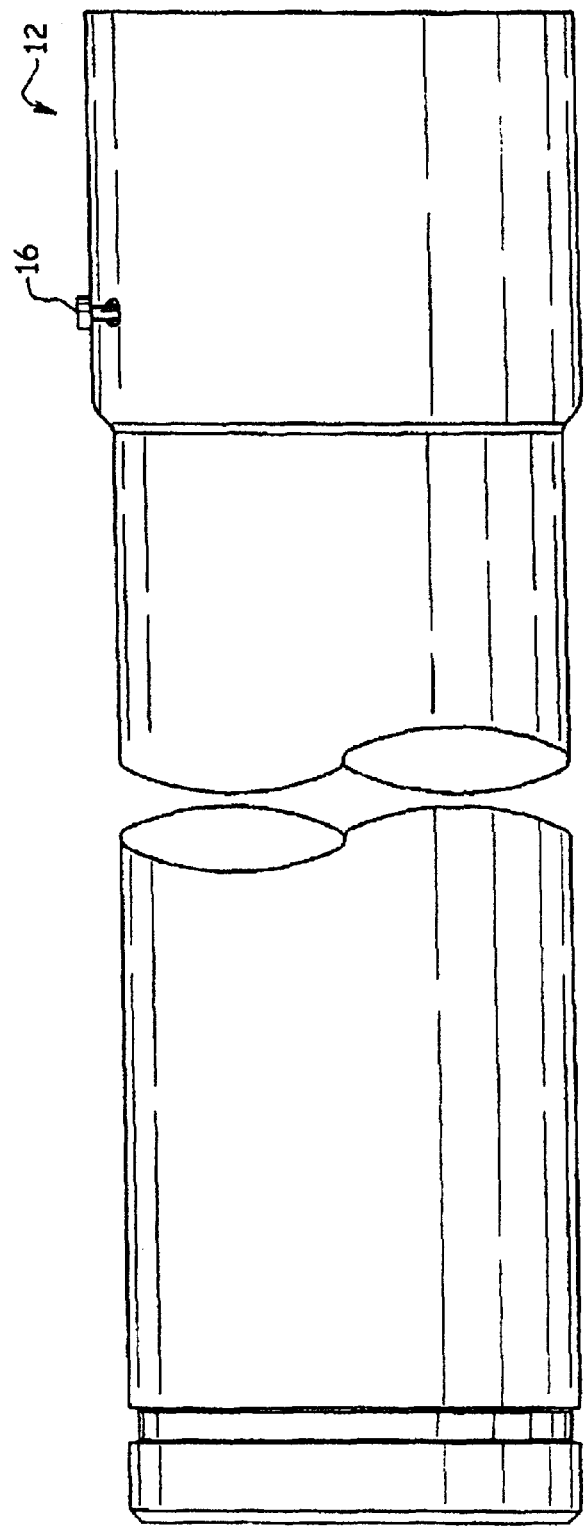
Fig. 5
AMENDED

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

FIG. 5 changed reference numeral 18 to 16.

AS A RESULT OF REEXAMINATION, IT HAS BEEN DETERMINED THAT:

Claims 1–14 are cancelled.

New claims 15–41 are added and determined to be patentable.

15. *A tubular conduit having a conduit inner surface and opposite first and second coupler end portions,*
   *said first coupler end portion having first coupler inner and outer surfaces,*
   *said conduit inner surface being outwardly curved adjacent said first coupler end portion along a transition region between said conduit inner surface and said first coupler inner surface,*
   *said first coupler inner surface having a pair of spaced-apart circumferential grooves therein adjacent said transition region,*
   *said pair of spaced-apart circumferential grooves including a sealing ring groove closest to said transition region and a first coupler locking strap groove on the opposite side of said sealing ring groove from said transition region,*
   *said second coupler end portion having a second coupler outer surface sized for close reception within said first coupler end portion,*
   *said second coupler end portion having a second coupler end and a circumferential outer chamfered end surface that slopes outwardly from said second coupler end toward said second coupler outer surface,*
   *surface when a second coupler end portion on one conduit is received in a first coupler end portion on another conduit with the second coupler end on the one conduit resting against the transition region of the other conduit,*
      *wherein said sealing ring has at least three inner and outer lobes thereon engaging both the bottom of said sealing ring groove and said second coupler outer surface.*

16. *A tubular conduit having a conduit inner surface and opposite first and second coupler end portions,*
   *said first coupler end portion having first coupler inner and outer surfaces,*
   *said conduit inner surface being outwardly curved adjacent said first coupler end portion along a transition region between said conduit inner surface and said first coupler inner surface,*
   *said first coupler inner surface having a pair of spaced-apart circumferential grooves therein adjacent said transition region,*
   *said pair of spaced-apart circumferential grooves including a sealing ring groove closest to said transition region and a first coupler locking strap groove on the opposite side of said sealing ring groove from said transition region,*
   *said second coupler end portion having a second coupler outer surface sized for close reception within said first coupler end portion,*
   *said second coupler end portion having a second coupler end and a circumferential outer chamfered end surface that slopes outwardly from said second coupler end toward said second coupler outer surface,*
   *a second coupler locking strap groove in said second coupler outer surface adjacent said second coupler end,*
   *the spacing between said first coupler locking strap groove and said transition region and between said second coupler end and said second coupler locking strap groove being such that said first and second coupler locking strap grooves are aligned when a second coupler end*
   *a second coupler locking strap groove in said second coupler outer surface adjacent said second coupler end,*
   *the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit,*
   *the spacing between said sealing ring groove and said transition region and between said second coupler end and said second coupler locking strap groove being such that said sealing ring groove is aligned with said seond coupler outer surface intermediate said second coupler locking strap groove and said second coupler end when a second coupler end portion on one conduit is received in a first coupler end portion on another conduit with the second coupler end on the one conduit resting against the transition region on the other conduit,*
   *said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, and one of said locking strap grooves being wider than the other to allow insertion of a locking strap thereinto through said slot despite some misalignment therebetween,*
   *including a sealing ring having a generally rectangular cross-sectional shape received in said sealing ring groove and projecting therefrom for engaging a said second coupler outer surface between said second coupler locking strap groove and said outer chamfered end portion on one conduit is received in a first coupler end portion on another conduit with the second coupler end on the one conduit resting against the transition region on the other conduit,*
   *the spacing between said sealing ring groove and said transition region and between said second coupler end* and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, and one of said locking strap grooves being wider than the other to allow insertion of a locking strap thereinto through said slot despite some misalignment therebetween, including a sealing ring having a generally rectangular cross-sectional shape received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit, and including a sealing ring having at least three inner and outer lobes thereon engaging both the bottom of said sealing ring groove and said second coupler outer surface.

17. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, including a sealing ring received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit, wherein both said sealing ring groove and said sealing ring have generally rectangular cross-sectional configurations, and wherein said sealing ring has an inner circumferential surface with a plurality of axially-spaced circumferential lobes thereon for engaging a said outer surface of a second coupler end portion.

18. The conduit of claim 17 wherein said plurality of axially-spaced circumferential lobes comprises at least three lobes.

19. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, including a sealing ring received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit, wherein both said sealing ring groove and said sealing ring have generally rectangular cross-sectional configurations, and wherein said sealing ring has inner and outer circumferential surfaces, a plurality of axially-spaced circumferential lobes on each of said inner and outer surfaces, said lobes on said outer surface engaging the bottom of said sealing ring groove and said lobes on said inner surface being engageable with an outer surface of a second coupler end portion when a second coupler end portion is received in the first coupler end portion.

20. The conduit of claim 19 wherein said plurality of axially-spaced circumferential lobes comprises at least three lobes.

21. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, wherein said first coupler end portion has an axial length of at least six inches and a terminal end, and both said sealing ring groove and said locking strap groove are located closer to said transition region than to said terminal end.

22. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, and wherein said conduit has a peripheral wall with a radial wall thickness, and each of said first and second coupler end portions has a radial wall thickness that is not greater than the radial wall thickness of said conduit along the remaining length thereof.

23. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, and wherein said first coupler end portion has an outer diameter that is greater than the outer diameter of said conduit along the remaining length thereof by an amount that is about two times the conduit wall thickness.

24. A tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a seond coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereof for receiving a locking strap that is insertable within the aligned first and second locking strap grooves on the second coupler end portion of one conduit that is received in the first coupler end portion on another conduit to lock the conduits together against separation, including a sealing ring received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit, wherein both said sealing ring groove and said sealing ring have generally rectangular cross-sectional configurations, wherein said sealing ring has inner and outer circumferential surfaces, a plurality of axially-spaced circumferential lobes on each of said inner and outer surfaces, said lobes on said outer surface engaging the bottom of said sealing ring groove and said lobes on said inner surface being engagable with an outer surface of a second coupler end portion when a second coupler end portion is received in the first coupler end portion, and wherein said first coupler end portion has an axial length of at least six inches and a terminal end, and both said sealing ring groove and said locking strap groove are located closer to said transition region than to said terminal end.

25. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, wherein both said sealing ring groove and said sealing ring have generally rectangular cross-sectional configurations, and wherein said sealing ring has an inner circumferential surface with a plurality of axially-spaced circumferential lobes thereon that are in sealing engagement with said second coupler outer surface.

26. The coupling of claim 25 wherein said plurality of axially-spaced circumferential lobes comprises at least three lobes.

27. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, wherein both said sealing ring groove and said sealing ring have generally rectangular cross-sectional configurations, and wherein said sealing ring has inner and outer circumferential surfaces, a plurality of axially-spaced circumferential lobes on each of said inner and outer surfaces, said lobes on said outer surface being in sealing engagement with the bottom of said sealing ring groove and said lobes on said inner surface being in sealing engagement with the second coupler outer surface.

28. The coupling of claim 27 wherein said plurality of axially-spaced circumferential lobes comprises at least three lobes.

29. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, and wherein said first coupler end portion has an axial length of at least six inches and a terminal end, and both said sealing ring groove and said locking strap groove are located closer to said transition region than to said terminal end.

30. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, and wherein each of said conduits has a peripheral wall with a radial wall thickness, and each of said first and second coupler end portions has a radial wall thickness that is not greater than the radial wall thickness of said conduit along the remaining length thereof.

31. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, wherein said first coupler end portion has an outer diameter that is greater than the outer diameter of said conduit along the remaining length thereof by an amount that is about two times the conduit wall thickness.

32. A coupling between a pair of first and second tubular conduits, said first tubular conduit having a first conduit inner surface and a first coupler end portion, said first coupler end portion having first coupler inner and outer surfaces, said first conduit inner surface being outwardly curved adjacent said first coupler end portion along a transition region between said first conduit inner surface and said first coupler inner surface, said first coupler inner surface having a pair of spaced-apart circumferential grooves therein adjacent said transition region, said pair of spaced-apart circumferential grooves including a sealing ring groove closest to said transition region and a first coupler locking strap groove on the opposite side of said sealing ring groove from said transition region, said second tubular conduit having a second coupler end portion, said second coupler end portion on said second tubular conduit having a second coupler outer surface sized for close reception within said first coupler end portion on said first tubular conduit, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler end portion on said second tubular conduit being received in said first coupler end portion on said first tubular conduit with said second coupler end on said second tubular conduit resting against said transition region on said first tubular conduit, the spacing between said first coupler locking strap groove and said transition region and between said second coupler end and said second coupler locking strap groove being such that said first and second coupler locking strap grooves are aligned when said second coupler end on said second tubular conduit is resting against said transition region on said first tubular conduit, a sealing ring received in said sealing ring groove, said sealing ring being in sealing engagement with said second coupler outer surface between said second coupler end and said second coupler locking strap groove, said first coupler end portion having a slot therethrough between said first coupler inner and outer surfaces in alignment with and intersecting said first coupler locking strap groove generally tangentially thereof, and a locking strap received in said first and second coupler locking strap grooves through said slot to lock the coupling between the first and second coupler end portions on said first and second tubular conduits together against separation, wherein both said sealing ring groove and said sealing ring have generally rectangular cross-sectional configurations, wherein said sealing ring has an inner circumferential surface with a plurality of axially-spaced circumferential lobes thereon that are in sealing engagement with said second coupler outer surface, and wherein said first coupler end portion has an axial length of at least six inches and a terminal end, and both said sealing ring groove and said locking strap groove are located closer to said transition region than to said terminal end.

33. The coupling of claim 32 wherein at least one of said locking strap grooves has an axial width larger than is required to freely receive the locking strap so that even though the two grooves are not directly opposite one another they still have adequate overlap to provide a circumferential passageway that is wide enough to receive the locking strap.

34. The coupling of claim 33 wherein the radial depth of the first and second locking strap grooves is about the same as the depth of the sealing ring groove.

35. A tubular conduit having opposite coupler end portions for joining together a plurality of such conduits end-to-end, said tubular conduit consisting essentially of a plastic tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves being the sole grooves in said first coupler inner surface and including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler locking strap groove being the sole groove in said second coupler outer surface, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation, including a sealing ring received in said sealing ring groove and projecting therefrom for engaging a said second coupler outer surface between said second coupler locking strap groove and said outer chamfered end surface when a second coupler end portion on one conduit is received in a first coupler end portion on another conduit with the second coupler end on the one conduit resting against the transition region of the other conduit, wherein both said sealing ring groove and said sealing ring have generally rectangular cross-sectional configurations, and wherein said sealing ring has an inner circumferential surface with a plurality of axially-spaced circumferential lobes thereon for engaging a said outer surface of a second coupler end portion.

36. The conduit of claim 35 wherein said first coupler end portion has an axial length of at least six inches and a termi-

17 nal end, and both said sealing ring groove and said locking strap groove are located closer to said transition region than to said terminal end.

37. *The conduit of claim 36 wherein at least one of said locking strap grooves has an axial width larger than is required to freely receive the locking strap so that even though the two grooves are not directly opposite one another they still have adequate overlap to provide a circumferential passageway that is wide enough to receive the locking strap.*

38. *The conduit of claim 37 wherein the radial depth of the first and second locking strap grooves is about the same as the depth of the sealing ring groove.*

39. *A tubular conduit having opposite coupler end portions for joining together a plurality of such conduits end-to-end,*

*said tubular conduit consisting essentially of a plastic tubular conduit having a conduit inner surface and opposite first and second coupler end portions,*

*said first coupler end portion having first coupler inner and outer surfaces,*

*said conduit inner surface being outwardly curved adjacent said first coupler end portion along a transition region between said conduit inner surface and said first coupler inner surface,*

*said first coupler inner surface having a pair of spaced-apart circumferential grooves therein adjacent said transition region,*

*said pair of spaced-apart circumferential grooves being the sole grooves in said first coupler inner surface and including a sealing ring groove closest to said transition region and a first coupler locking strap groove on the opposite side of said sealing ring groove from said transition region,*

*said second coupler end portion having a second coupler outer surface sized for close reception within said first coupler end portion,*

*said second coupler end portion having a second coupler end and a circumferential outer chamfered end surface that slopes outwardly from said second coupler end toward said second coupler outer surface,*

*a second coupler locking strap groove in said second coupler outer surface adjacent said second coupler end,*

*said second coupler locking strap groove being the sole groove in said second coupler outer surface,*

*the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit,*

*the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit,*

*said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation,*

*wherein said first coupler end portion has an axial length of at least six inches and a terminal end, and both said sealing ring groove and said locking strap groove are located closer to said transition region than to said terminal end.*

40. *A tubular conduit having opposite coupler end portions for joining together a plurality of such conduits end-to-end,*

*said tubular conduit consisting essentially of a plastic tubular conduit having a conduit inner surface and opposite first and second coupler end portions,*

*said first coupler end portion having first coupler inner and outer surfaces,*

*said conduit inner surface being outwardly curved adjacent said first coupler end portion along a transition region between said conduit inner surface and said first coupler inner surface,*

*said first coupler inner surface having a pair of spaced-apart circumferential grooves therein adjacent said transition region,*

*said pair of spaced-apart circumferential grooves being the sole grooves in said first coupler inner surface and including a sealing ring groove closest to said transition region and a first coupler locking strap groove on the opposite side of said sealing ring groove from said transition region,*

*said second coupler end portion having a second coupler outer surface sized for close reception within said first coupler end portion,*

*said second coupler end portion having a second coupler end and a circumferential outer chamfered end surface that slopes outwardly from said second coupler end toward said second coupler outer surface,*

*a second coupler locking strap groove in said second coupler outer surface adjacent said second coupler end,*

*said second coupler locking strap groove being the sole groove in said second coupler outer surface,*

*the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit,*

*the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit,* said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation, and wherein said conduit has a peripheral wall with a radial wall thickness, and each of said first and second coupler end portions has a radial wall thickness that is not greater than the radial wall thickness of said conduit along the remaining length thereof.

41. A tubular conduit having opposite coupler end portions for joining together a plurality of such conduits end-to-end, said tubular conduit consisting essentially of a plastic tubular conduit having a conduit inner surface and opposite first and second coupler end portions, said first coupler end portion having first coupler inner and outer surfaces, said conduit inner surface being outwardly curved adjacent said first coupler end portion along a transition region between said conduit inner surface and said first coupler inner surface, said first coupler inner surface having a pair of spaced-apart circumferential grooves therein adjacent said transition region, said pair of spaced-apart circumferential grooves being the sole grooves in said first coupler inner surface and including a sealing ring groove closest to said transition region and a first coupler locking strap groove on the opposite side of said sealing ring groove from said transition region, said second coupler end portion having a second coupler outer surface sized for close reception within said first coupler end portion, said second coupler end portion having a second coupler end and a circumferential outer chamfered end surface that slopes outwardly from said second coupler end toward said second coupler outer surface, a second coupler locking strap groove in said second coupler outer surface adjacent said second coupler end, said second coupler locking strap groove being the sole groove in said second coupler outer surface, the spacing between said first coupler locking strap groove and said transition region and between said second coupler end and said second coupler locking strap groove being such that said first and second coupler locking strap grooves are aligned when a second coupler end portion on one conduit is received in a first coupler end portion on another conduit with the second coupler end on the one conduit resting against the transition region on the other conduit, the spacing between said sealing ring groove and said transition region and between said second coupler end and said second coupler locking strap groove being such that said sealing ring groove is aligned with said second coupler outer surface intermediate said second coupler locking strap groove and said second coupler end when a second coupler end portion on one conduit is received in a first coupler end portion on another conduit with the second coupler end on the one conduit resting against the transition region on the other conduit, said first coupler end portion having a slot therethrough between said first coupler inner and outer surfaces in alignment with and intersecting said first coupler locking strap groove generally tangentially thereto for receiving a locking strap that is insertable within the aligned first and second locking strap grooves on the second coupler end portion of one conduit that is received in the first coupler end portion on another conduit to lock the conduits together against separation, and wherein said first coupler end portion has an outer diameter that is greater than the outer diameter of said conduit along the remaining length thereof by an amount that is about two times the conduit wall thickness.

* * * * *